US011005351B2

(12) United States Patent
Buerger et al.

(10) Patent No.: US 11,005,351 B2
(45) Date of Patent: May 11, 2021

(54) AUTOMOTIVE ELECTRIC FLUIDIC PUMP

(71) Applicant: PIERBURG PUMP TECHNOLOGY GMBH, Neuss (DE)

(72) Inventors: Frank Buerger, Langerwehe (DE); Martin Schumachers, Schwalmtal (DE); Michael Haase, Erbach (DE); Harald Spiertz, Erkelenz (DE); Viktor Schroeder, Leghorn (IT); Alessandro Malvasi, Leghorn (IT); Andreas Wulf, Duesseldorf (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 529 days.

(21) Appl. No.: 16/069,170

(22) PCT Filed: Jan. 13, 2016

(86) PCT No.: PCT/EP2016/050553
§ 371 (c)(1),
(2) Date: Jul. 11, 2018

(87) PCT Pub. No.: WO2017/121472
PCT Pub. Date: Jul. 20, 2017

(65) Prior Publication Data
US 2019/0020255 A1  Jan. 17, 2019

(51) Int. Cl.
*H02K 29/08* (2006.01)
*B62D 5/06* (2006.01)
*H02K 5/04* (2006.01)

(52) U.S. Cl.
CPC ............. *H02K 29/08* (2013.01); *B62D 5/064* (2013.01); *H02K 5/04* (2013.01); *H02K 2211/03* (2013.01)

(58) Field of Classification Search
CPC .................. H02K 29/08; H02K 2211/03
(Continued)

(56) References Cited

U.S. PATENT DOCUMENTS 4,339,875 A  7/1982 Müller
4,580,979 A  4/1986 Leonard
(Continued)

FOREIGN PATENT DOCUMENTS

CN  1085694 A  4/1994
CN  101257235 A  9/2008
(Continued)

*Primary Examiner* — Gary A Nash
(74) *Attorney, Agent, or Firm* — Norman B. Thot

(57) ABSTRACT

An automotive electric fluidic pump includes a brushless and electronically commutated electric drive motor. The electric drive motor includes a permanent-magnetic motor rotor which rotates around a rotation axis and includes rotor poles, stator-sided electro-magnetic coils, a printed circuit board with openings, at least two stator-sided Hall sensors arranged on a proximal side of the printed circuit board to face the permanent-magnetic motor rotor, and a ferromagnetic back iron member arranged at a distal side of the printed circuit board to provide a direct magnetic coupling of the Hall sensors with each other. The Hall sensors are arranged eccentrically to detect axial magnetic fields of the rotor poles. The ferromagnetic back iron member comprises axial protrusions. An axial protrusion extends into an opening of the printed circuit board. Each axial protrusion faces a Hall sensor.

11 Claims, 2 Drawing Sheets

(58) Field of Classification Search
USPC .............................................. 310/68 B, 68 R
See application file for complete search history.

(56) References Cited

U.S. PATENT DOCUMENTS

| | | |
|---|---|---|
| 4,755,699 A | 7/1988 | Schmider |
| 5,864,192 A | 1/1999 | Nagate et al. |
| 6,373,241 B1 | 4/2002 | Weber et al. |
| 2005/0077794 A1 | 4/2005 | Horng et al. |
| 2008/0211357 A1 | 9/2008 | Kataoka et al. |
| 2008/0218160 A1* | 9/2008 | Tsuchida .............. H02K 11/215 324/207.25 |
| 2008/0290748 A1* | 11/2008 | Pfendler ................ H02K 11/33 310/89 |

FOREIGN PATENT DOCUMENTS

| | | | |
|---|---|---|---|
| CN | 102868279 A | 1/2013 | |
| DE | 29 18 329 A1 | 12/1980 | |
| DE | 3434965 A1 | 4/1985 | |
| EP | 2450575 A1 * | 5/2012 | ......... F04D 13/0673 |
| EP | 2 701 291 A1 | 2/2014 | |
| EP | 2701291 A1 * | 2/2014 | ............. H02K 29/08 |
| EP | 2 704 299 A1 | 3/2014 | |
| EP | 2704299 A1 * | 3/2014 | ............. H02K 29/08 |
| FR | 2998734 A1 * | 5/2014 | ............. H02K 29/08 |
| JP | S56-156378 A | 12/1981 | |
| JP | 59-11762 A | 1/1984 | |
| JP | S60-135041 A | 7/1985 | |
| JP | 06-276719 A | 9/1994 | |
| JP | 2001-506368 A | 5/2001 | |
| JP | 2011-128028 A | 6/2011 | |
| WO | WO 2015/074914 A2 | 5/2015 | |

* cited by examiner

AUTOMOTIVE ELECTRIC FLUIDIC PUMP

CROSS REFERENCE TO PRIOR APPLICATIONS

This application is a U.S. National Phase application under 35 U.S.C. § 371 of International Application No. PCT/EP2016/050553, filed on Jan. 13, 2016. The International Application was published in English on Jul. 20, 2017 as WO 2017/121472 A1 under PCT Article 21(2).

FIELD

The present invention relates to an automotive electric fluidic pump with a brushless and electronically commutated electric drive motor and with a plurality of Hall sensors for the accurate detection of the rotational rotor position.

BACKGROUND

The drive motor comprises a permanent-magnetic motor rotor rotating around a rotation axis and being provided with a plurality of rotor poles, a plurality of stator-sided electro-magnetic coils, and a printed circuit board lying in a transversal plane. The drive motor further comprises at least two stator-sided Hall sensors arranged on the printed circuit board at a proximal side thereof and facing the motor rotor, wherein the Hall sensors are arranged eccentrically so that the Hall sensors detect the axial magnetic fields of the rotor poles. A ferromagnetic back iron member is also provided at a distal side of the printed circuit board for a direct magnetic coupling of the Hall sensors with each other.

A respective automotive electric fluidic pump having a brushless and electronically commutated electric drive motor is described in EP 2 701 291 A1. The position of the motor rotor is detected by three Hall sensors mounted on a PCB (printed circuit board) which are connected to three field conducting pins. An interference ring is mounted on a side of the PCB opposite to a side where the Hall sensors are provided to the PCB.

The exact detection of the rotational rotor position of the motor rotor of an automotive fluidic pump, which is driven by an electronically commutated drive motor, is important for a safe and energy-efficient operation. An accurate control of the drive motor requires an exact detection of the rotational rotor position of the motor rotor. An accurate motor control avoids undesired operation states, such as start-up problems, so-called toggling etc. Such undesired operation states can in particular occur with displacement fluidic pumps because of a wide range of torques. The total energy consumption is also minimized by an accurate timing of the commutation in the stator coils.

Hall sensors are used for accurate rotor position detection; the Hall sensors can be arranged axially of the motor rotor. The Hall sensors thereby detect the passing rotating magnetic fields generated by the rotor poles. The absolute field strength of the magnetic field of the rotor poles detected by the Hall sensor and the strength of interference fields are relevant for the accuracy of the rotor position detection with Hall sensors.

SUMMARY

An aspect of the present invention is to provide an automotive electric fluidic pump having a brushless and electronically commutated electric drive motor which detects the rotational rotor position more accurately and which can be manufactured more economically.

In an embodiment, the present invention provides an automotive electric fluidic pump which includes an electric drive motor which is brushless and electronically commutated. The electric drive motor includes a permanent-magnetic motor rotor configured to rotate around a rotation axis and comprising a plurality of rotor poles, a plurality of stator-sided electro-magnetic coils, a printed circuit board arranged to lie in a transversal plane, at least two stator-sided Hall sensors arranged on a proximal side of the printed circuit board to face the permanent-magnetic motor rotor, and a ferromagnetic back iron member arranged at a distal side of the printed circuit board to provide a direct magnetic coupling of the at least two stator-sided Hall sensors with each other. The printed circuit board comprises openings arranged therein. The at least two stator-sided Hall sensors are arranged eccentrically to detect axial magnetic fields of the plurality of rotor poles. The ferromagnetic back iron member comprises axial protrusions. A respective one of the axial protrusions is arranged to extend into a respective one of the openings of the printed circuit board. Each axial protrusion is arranged to face a respective one of the at least two stator-sided Hall sensors.

BRIEF DESCRIPTION OF THE DRAWINGS

The present invention is described in greater detail below on the basis of embodiments and of the drawings in which.

DETAILED DESCRIPTION

Figure 1:
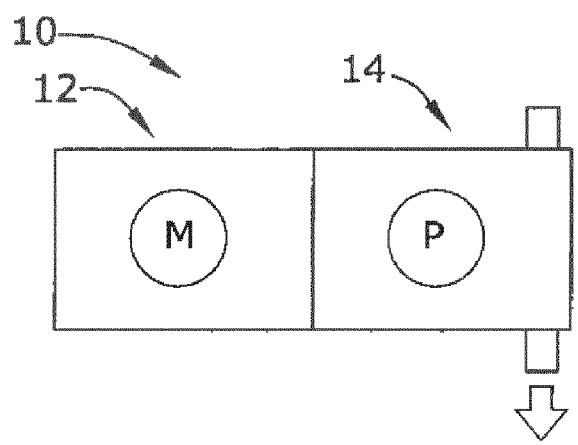
FIG. 1 shows a schematic presentation of an electrical automotive fluid pump comprising an electric drive motor and a pumping unit.

The automotive electric fluidic pump according to the present invention provides a ferromagnetic back iron member which directly magnetically couples the Hall sensors with each other. The ferromagnetic back iron member comprises axial protrusions which respectively extend into openings of the printed circuit board. Each protrusion faces the corresponding Hall sensor. The distance is thereby minimized between the ferromagnetic sensor circuit member and the Hall sensors. The magnetic circuit for the magnetic fields emitted in an axial direction by the rotor poles is significantly improved, i.e., the magnetic resistance in the Hall sensor circuit is reduced.

A magnetic gap is provided between the side of the Hall sensors and the rotor poles. The quality of the magnetic circuit is improved by the ferromagnetic back iron member. The signal/noise ratio is thereby increased significantly at each Hall sensor so that the rotor position can be determined more accurately. Undesired operational states of the rotor can be avoided and the quality of the motor control can be reduced so that the motor control can be provided simply and inexpensively.

In an embodiment of the present invention, the ferromagnetic back iron member can, for example, be fixed to the printed circuit board by soldering. The sensor circuit member can thereby be connected easily and quickly to the printed circuit board. The automotive electric fluidic pump can accordingly be manufactured more economically.

In an embodiment of the present invention, the ferromagnetic back iron member can, for example, define a closed ring lying in a transversal plane. The magnetic coupling of the Hall sensors and the ferromagnetic back iron member are improved by a closed ring. The magnetic resistance in the Hall sensor circle is accordingly decreased so that the signal quality is improved.

The ferromagnetic back iron member can, for example, define a circular ring. A region in the middle of the circular ring is thereby free so that a rotor shaft can extend through the ring.

In an embodiment of the present invention, field conducting pins can, for example, be provided which are arranged substantially axially and which are assigned to each Hall sensor proximally. The Hall sensors can therefore be arranged remote with an axial distance from the motor rotor so that the Hall sensors may be arranged together with the motor controller on a single printed circuit board. The proximal end of the field conducting pin is provided axially as close as possible to the motor rotor. The field conducting pin bundles and forwards the axial magnetic field of the rotor poles to the respective Hall sensor with relative low magnetic loss. The field conducting pin together with the ferromagnetic back iron member provides a low-loss magnetic circuit which provides a strong signal for the Hall sensors. The Hall sensors can accordingly be arranged remote from the stator-coils so that the magnetic interferences caused by the magnetic coils are relatively small. The signal is nevertheless so high that the motor controller can have a relatively simple design, thereby saving manufacturing costs.

In an embodiment of the present invention, the ferromagnetic back iron member can, for example, be a metal sheet body. A ferromagnetic back iron member made of a metal sheet body is inexpensive and can be easily processed by stamping and deep-drawing. The ferromagnetic back iron member can therefore be manufactured economically.

In an embodiment of the present invention, the protrusions can, for example, be made by deep-drawing and define proximal noses. No further element needs to be provided to the ferromagnetic back iron member. The ferromagnetic back iron member can accordingly be made from a single piece. Some manufacturing steps can thereby be saved. The ferromagnetic back iron member can thus be manufactured economically.

In an embodiment of the present invention, each protrusion can, for example, have an axial length of more than 80% of the thickness of the printed circuit board. According to the present invention, the axial length of the protrusions is the length of the protrusions extending into the openings. The distance between the protrusion of the ferromagnetic back iron members and the Hall sensors can thereby be made small, thereby improving signal quality.

In an embodiment of the present invention, each protrusion can, for example, have an outer diameter which is at least 0.7 mm smaller than the diameter of the corresponding opening in the printed circuit board. The ferromagnetic back iron member can thereby also be mounted to the printed circuit board if the position of the openings does not exactly match the positions of the protrusion. The manufacturing tolerances can thereby be less strict, thereby allowing the electric fluidic pump to be manufactured more economically.

In an embodiment of the present invention, each protrusion can, for example, be formed conically. According to the present invention, the diameter of the conical protrusion decreases with decreasing distance to the Hall sensors. The protrusions can, for example, be formed as truncated cones.

In an embodiment of the present invention, each protrusion can, for example, be provided with a collar portion at a distal end thereof. A collar portion according to the present invention is a ring-shaped portion which surrounds the protrusions in a transversal plane. The maximal depth of the protrusion protruding into the opening is thereby limited. The final minimal distance between the protrusion and the Hall sensor is thereby precisely adjusted.

Further advantages will become evident by the following detailed description of an embodiment of the present invention in combination with the drawings.

FIG. 1 shows a schematic view of an electrical automotive fluid pump 10 comprising two modules, i.e., an electric drive motor 12 and a pumping unit 14. The pumping unit 14 can be a displacement pump, for example, a vane pump, a rotary vane pump or a piston pump. The pumping unit 14 also could be a flow pump, for example, a centrifugal pump or an impeller pump.

Figure 2:
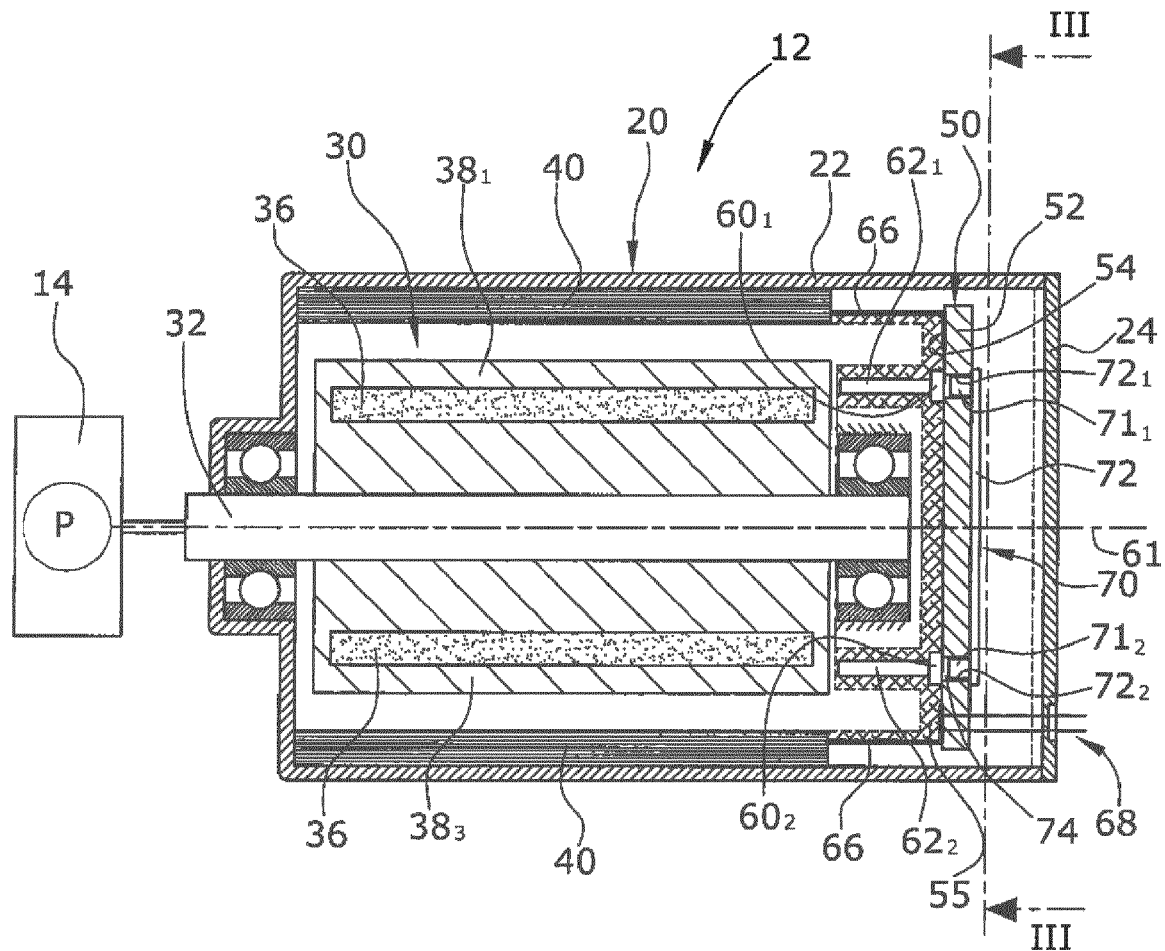
FIG. 2 shows a longitudinal section of the electric drive motor of the electrical automotive fluid pump shown in FIG. 1.

FIG. 2 shows a longitudinal section of the electric drive motor 12. The electric drive motor 12 is a brushless and electronically commutated electric drive motor 12. The electric drive motor 12 comprises a permanent-magnetically excited motor rotor 30 with four rotor poles $38_1$-$38_4$, in each of which a permanent magnet 36 is embedded. Six electro-magnetic coils 40 are arranged on a stator side, which electro-magnetic coils 40 generate a rotating rotor magnetic field. The electro-magnetic coils 40 are arranged in a motor housing 20. The motor housing 20 is defined by a housing cup 22 and a housing cover 24. The motor rotor 30 comprises a motor shaft 32 which directly drives a pump shaft of the pumping unit 14.

A printed circuit board 50 is arranged at an axial end side of the electric drive motor 12 facing away from the pumping unit 14 and lying in a transversal plane. The printed circuit board 50 comprises a board body 52 having conductor paths 54 at a proximal side thereof. The proximal side of the board body 52 is the side axially facing the motor rotor 30. The distal side of the board body 52 is the side being axially more remote from the motor rotor 30. The control electronics and the power electronics of the motor control are both arranged on the proximal side of the board body 52. Three Hall sensors $60_k$, $60_2$, $60_3$ are further arranged on the proximal side of the board body 52. The Hall sensors $60_1$, $60_2$, $60_3$ are arranged in approximately the same radius to a motor axis, which is the rotation axis 61, as the permanent magnets 36 of the motor rotor 30.

The power electronics of the printed circuit board 50 is electrically connected to the electro-magnetic coils 40 by the conductor paths 54 and by axial connecting lines 66. Each Hall sensor $60_1$, $60_2$, $60_3$ is respectively associated with a ferromagnetic axial field conducting pin $62_k$, $62_2$, $62_3$ which is placed proximally to the respective Hall sensor $60_k$, $60_2$, $60_3$. The proximal longitudinal ends of the ferromagnetic axial field conducting pins $62_1$, $62_2$, $62_3$ only have a small distance from the axially opposite end of the motor rotor 30.

A ferromagnetic back iron member 70 is arranged as shown in FIG. 2 on the distal side of the printed circuit board 50. The ferromagnetic back iron member 70 is made of a one-piece body made of a ferromagnetic material and is soldered to the printed circuit board 50. The ferromagnetic back iron member 70 comprises three axial conically shaped protrusions $71_k$, $71_2$, $71_3$ extending into corresponding openings $72_k$, $72_2$, $72_3$ of the printed circuit board 50 so that each axial protrusion $71_1$, $71_2$, $71_3$ axially faces a Hall sensor $60_1$, $60_2$, $60_3$. A relatively small gap 74 is formed between the axial protrusion $71_1$, $71_2$, $71_3$ and the respective Hall sensor $60_1$, $60_2$, $60_3$.

FIG. 2 further shows that the printed circuit board 50 including the control electronics, the Hall sensors $60_k$, $60_2$, $60_3$, and the axial field conducting pins $62_k$, $62_2$, $62_3$ are cast into a monolithic plastic casting 55. The conductor paths 54 of the printed circuit board 50 are connected to a motor plug 68 by connecting lines.

Figure 3:
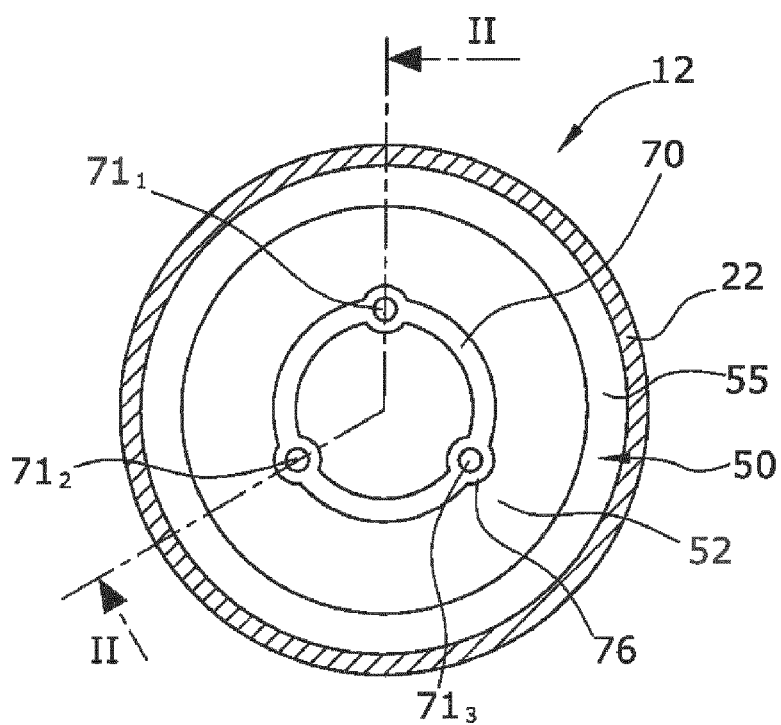
FIG. 3 shows a top view of the printed circuit board comprising the ferromagnetic back iron member.

FIG. 3 shows a top view of the printed circuit board 50 comprising the ferromagnetic back iron member 70. The ferromagnetic back iron member 70 is formed as a ring-shaped member. Each protrusion $71_1$, $71_2$, $71_3$ is surrounded by a circular collar portion 76 lying in a transversal plane, both covering the opening $72_1$, $72_2$, $72_3$.

As can be seen in FIG. 2, a magnetic circuit is formed by the ferromagnetic back iron member 70 on the distal side of the Hall sensors $60_1$-$60_3$, the axial field conducting pins $62_1$, $62_2$, $62_3$ proximal to the Hall sensors $60_1$-$60_3$, and the ferromagnetic motor rotor 30. The overall total magnetic resistance is therefore low. The magnetic field generated by the rotor permanent magnets 36 generates a relatively high field strength in the region of the Hall sensors $60_1$-$60_3$. A high signal/noise ratio is therefore present at the Hall sensors $60_1$-$60_3$ which enables a series of constructive and conceptual simplifications to reduce the electric power loss and simplify manufacturing.

The present invention is not limited to embodiments described herein; reference should be had to the appended claims.

REFERENCE NUMERALS 10 electric automotive fluid pump
12 electric drive motor
14 pumping unit
20 motor housing
22 housing cup
24 housing cover
30 motor rotor
32 motor shaft
36 permanent magnet
$38_1$-$38_4$ rotor poles
40 electro-magnetic coils
50 printed circuit board
52 board body
54 conductor path
55 monolithic plastic casting
$60_1$-$60_3$ Hall sensors
61 rotation axis
$62_1$-$62_3$ ferromagnetic axial field conducting pins
66 axial connecting line
68 motor plug
70 ferromagnetic back iron member
$71_1$-$71_3$ protrusions
$72_1$-$72_3$ openings
74 gap
76 collar portion

What is claimed is:

1. An automotive electric fluidic pump comprising an electric drive motor which is brushless and electronically commutated, the electric drive motor comprising:
    a permanent-magnetic motor rotor configured to rotate around a rotation axis and comprising a plurality of rotor poles;
    a plurality of stator-sided electro-magnetic coils;
    a printed circuit board arranged to lie in a first transversal plane, the printed circuit board comprising openings arranged therein;
    at least two stator-sided Hall sensors arranged on a proximal side of the printed circuit board to face the permanent-magnetic motor rotor, the at least two stator-sided Hall sensors being arranged eccentrically to detect axial magnetic fields of the plurality of rotor poles; and
    a ferromagnetic back iron member arranged at a distal side of the printed circuit board to provide a direct magnetic coupling of the at least two stator-sided Hall sensors with each other, the ferromagnetic back iron member comprising axial protrusions, a respective one of the axial protrusions being arranged to extend into a respective one of the openings of the printed circuit board, each axial protrusion being arranged to face a respective one of the at least two stator-sided Hall sensors.

2. The automotive electric fluidic pump as recited in claim 1, wherein the ferromagnetic back iron member is fixed to the printed circuit board via a soldering.

3. The automotive electric fluidic pump as recited in claim 1, wherein the ferromagnetic back iron member is configured to define a closed ring lying in a second transversal plane.

4. The automotive electric fluidic pump as recited in claim 1, wherein the ferromagnetic back iron member is configured to define a circular ring.

5. The automotive electric fluidic pump as recited in claim 1, further comprising:
    field conducting pins which are arranged substantially axially, a respective one of the field conducing pins being assigned to a respective one of the at least two stator-sided Hall sensors in a proximal direction.

6. The automotive electric fluidic pump as recited in claim 1, wherein the ferromagnetic back iron member is a metal sheet body.

7. The automotive electric fluidic pump as recited in claim 1, wherein each of the axial protrusions are made via a deep-drawing so as to define a proximal nose.

8. The automotive electric fluidic pump as recited in claim 1, wherein,
    the printed circuit board further comprises a thickness, and
    each of the axial protrusions comprises an axial length which is more than 80% of the thickness of the printed circuit board.

9. The automotive electric fluidic pump as recited in claim 1, wherein,
    each of the openings in the printed circuit board comprise a diameter, and
    each of the axial protrusions comprises an outer diameter which is at least 0.7 mm smaller than the diameter of the opening in the printed circuit board corresponding thereto.

10. The automotive electric fluidic pump as recited in claim 1, wherein each of the axial protrusions comprises a conical shape.

11. The automotive electric fluidic pump as recited in claim 1, wherein each of the axial protrusions comprises a collar portion at a distal end.

* * * * *